(12) United States Patent
Kirstein et al.

(10) Patent No.: US 7,502,843 B2
(45) Date of Patent: Mar. 10, 2009

(54) SERVER QUEUING SYSTEM AND METHOD

(75) Inventors: Jack Michael Kirstein, Seattle, WA (US); Chih-Jen Huang, Kirkland, WA (US); Pradeep GanapathyRaj, Bellevue, WA (US); Sharry Claypool, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 615 days.

(21) Appl. No.: 11/026,501

(22) Filed: Dec. 30, 2004

(65) Prior Publication Data

US 2006/0146848 A1 Jul. 6, 2006

(51) Int. Cl.
*G06F 15/173* (2006.01)
(52) U.S. Cl. ............................. 709/223; 709/224; 707/8
(58) Field of Classification Search ................. 709/203, 709/202, 213, 224, 206, 223; 707/1, 10, 707/13, 102, 8, 104.1
See application file for complete search history.

(56) References Cited

U.S. PATENT DOCUMENTS

| | | | | |
|---|---|---|---|---|
| 6,058,389 | A * | 5/2000 | Chandra et al. ................. 707/1 |
| 6,226,641 | B1 * | 5/2001 | Hickson et al. ................. 707/8 |
| 6,425,017 | B1 * | 7/2002 | Dievendorff et al. ........ 719/315 |
| 6,481,005 | B1 * | 11/2002 | Crowley et al. ............. 717/100 |
| 6,658,485 | B1 * | 12/2003 | Baber et al. .................. 719/314 |
| 7,035,852 | B2 * | 4/2006 | Hopewell et al. ............... 707/8 |
| 7,124,110 | B1 * | 10/2006 | Kemp et al. .................... 705/37 |
| 7,421,501 | B2 * | 9/2008 | Critchley et al. ............ 709/227 |
| 2002/0087507 | A1 * | 7/2002 | Hopewell et al. ............... 707/1 |
| 2003/0058878 | A1 | 3/2003 | Minnick et al. ............. 370/412 |
| 2003/0081624 | A1 | 5/2003 | Aggarwal et al. ........... 370/412 |
| 2005/0080759 | A1 * | 4/2005 | Brown et al. .................... 707/1 |
| 2005/0131883 | A1 * | 6/2005 | Buxton et al. .................. 707/3 |
| 2006/0085798 | A1 * | 4/2006 | Bendiksen et al. .......... 719/318 |
| 2006/0177069 | A1 * | 8/2006 | Critchley et al. ............ 380/283 |
| 2006/0248536 | A1 * | 11/2006 | Eckert ......................... 719/314 |
| 2007/0083569 | A1 * | 4/2007 | Wong et al. ................. 707/201 |

* cited by examiner

*Primary Examiner*—Lashonda T Jacobs
(74) *Attorney, Agent, or Firm*—Merchant & Gould PC

(57) ABSTRACT

A queuing server is used for reliable message transport, where one subsystem desires to execute one or more ordered operations asynchronously. Messages are sent to the queue in groups, which may have one or more messages. Messages within a particular group are processed in a predetermined order. Optionally, groups of messages can marked as correlated such that all groups within a particular correlation can be processed in a predetermined order. A message can be stored in a SQL database table until processing of that message is complete. The receiving side of the message system can be scaled across multiple machines and/or across available resources of any given machine. The system can handle "disaster" scenarios on both the sending side (i.e. the sending machine crashes in the middle of sending a group), and the receiving side (i.e., a power failure causes a reboot in at least one of the receiving machines).

20 Claims, 5 Drawing Sheets

SERVER QUEUING SYSTEM AND METHOD

BACKGROUND OF THE INVENTION

Queuing systems allow several different users (and/or processes) to send data and/or processing requests to be stored in a queue for later use by a receiving subsystem. For example, a project server subsystem can send one or more messages to the queuing system. The queuing system stores the information until the receiving subsystem can retrieve and process the stored information. However, machine failures and communication interruptions between and amongst the subsystems and queuing system can cause errors in processing and/or make it impossible to processed the stored information.

SUMMARY OF THE INVENTION

The present invention is directed to a server queuing method and system for reliable message transport. The queuing server can be used, for example, where one subsystem desires to execute one or more ordered operations asynchronously. Messages are sent to the queue in groups, which may have one or more messages. Messages within a particular group are processed in a predetermined order. Groups of messages can be marked as correlated such that all groups within a particular correlation can be processed in a predetermined order. A message can be stored in a SQL database table until processing of that message is complete. The receiving side of the message system can be scaled across multiple machines and/or across available resources of any given machine. The system can handle "disaster" scenarios on both the sending side (i.e. the sending machine crashes in the middle of sending a group), and the receiving side (i.e., a power failure causes a reboot in at least one of the receiving machines).

In one aspect of the invention, a queuing system receives message groups that are sent from a sender subsystem, wherein each message group comprises at least one message. The received message groups are stored in a predetermined order using the queuing system. The queuing system receives a correlation identifier for each message group; the received correlation identifier is stored using the queuing system. The stored message groups and the correlation identifiers are sent in accordance with the predetermined order.

DETAILED DESCRIPTION OF THE PREFERRED EMBODIMENT

The present invention is directed to a server queuing method and system for reliable message transport. The queuing server can be used, for example, where one subsystem desires to execute one or more ordered operations asynchronously. Messages are sent to the queue in groups, which may have one or more messages. Messages within a particular group are processed in a predetermined order. Groups of messages can be marked as correlated such that all groups within a particular correlation can be processed in a predetermined order. A message can be stored in a SQL database table until processing of that message is complete. The receiving side of the message system can be scaled across multiple machines and/or across available resources of any given machine. The system can handle "disaster" scenarios on both the sending side (i.e. the sending machine crashes in the middle of sending a group), and the receiving side (i.e., a power failure causes a reboot in at least one of the receiving machines).

Illustrative Operating Environment

Figure 1:
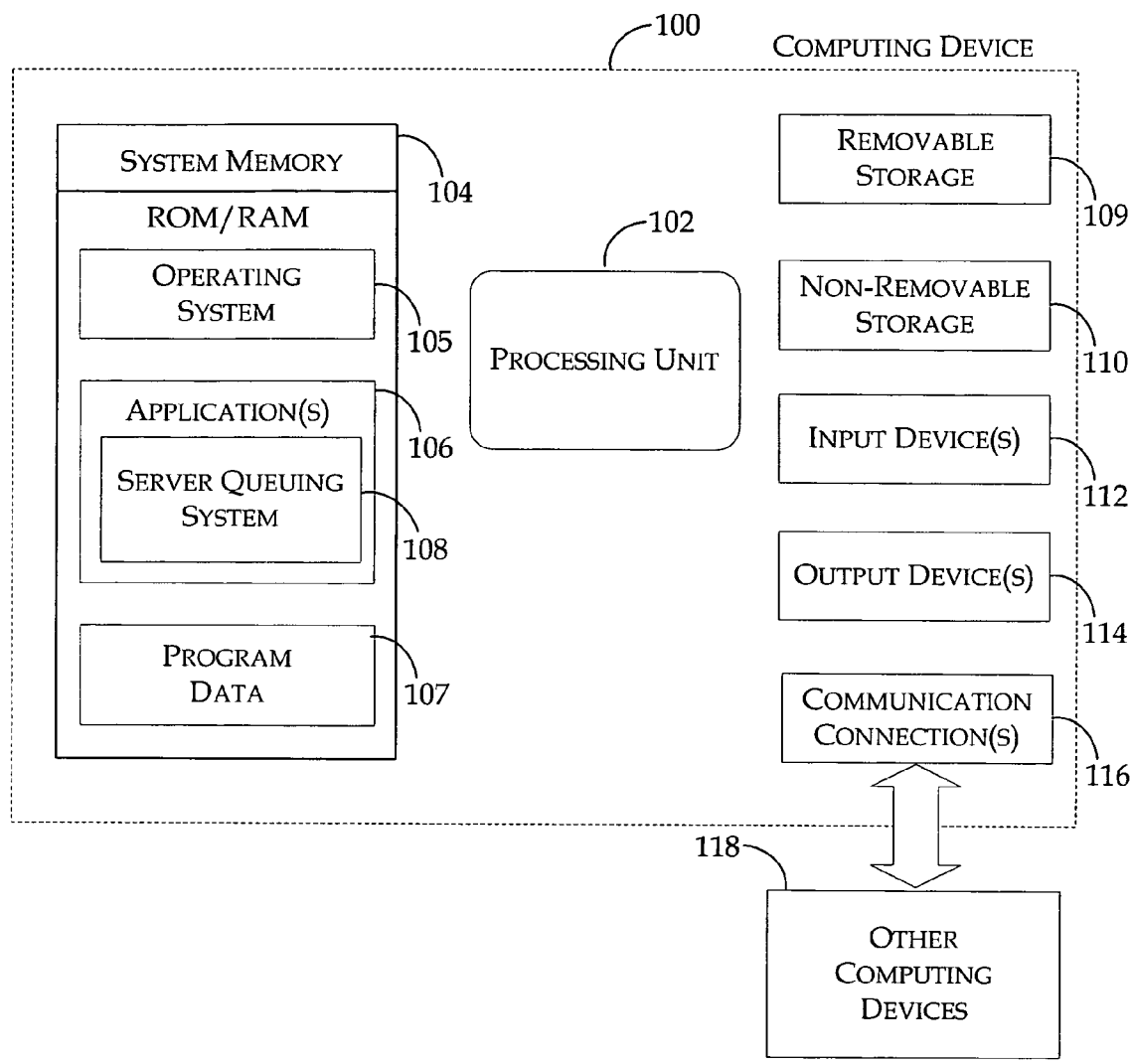
FIG. 1 illustrates a computing device that may be used according to an example embodiment of the present invention.

With reference to FIG. 1, one example system for implementing the invention includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. A server queuing system 108, which is described in detail below, is typically implemented within applications 106.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large-scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Queuing System Server

Figure 2:
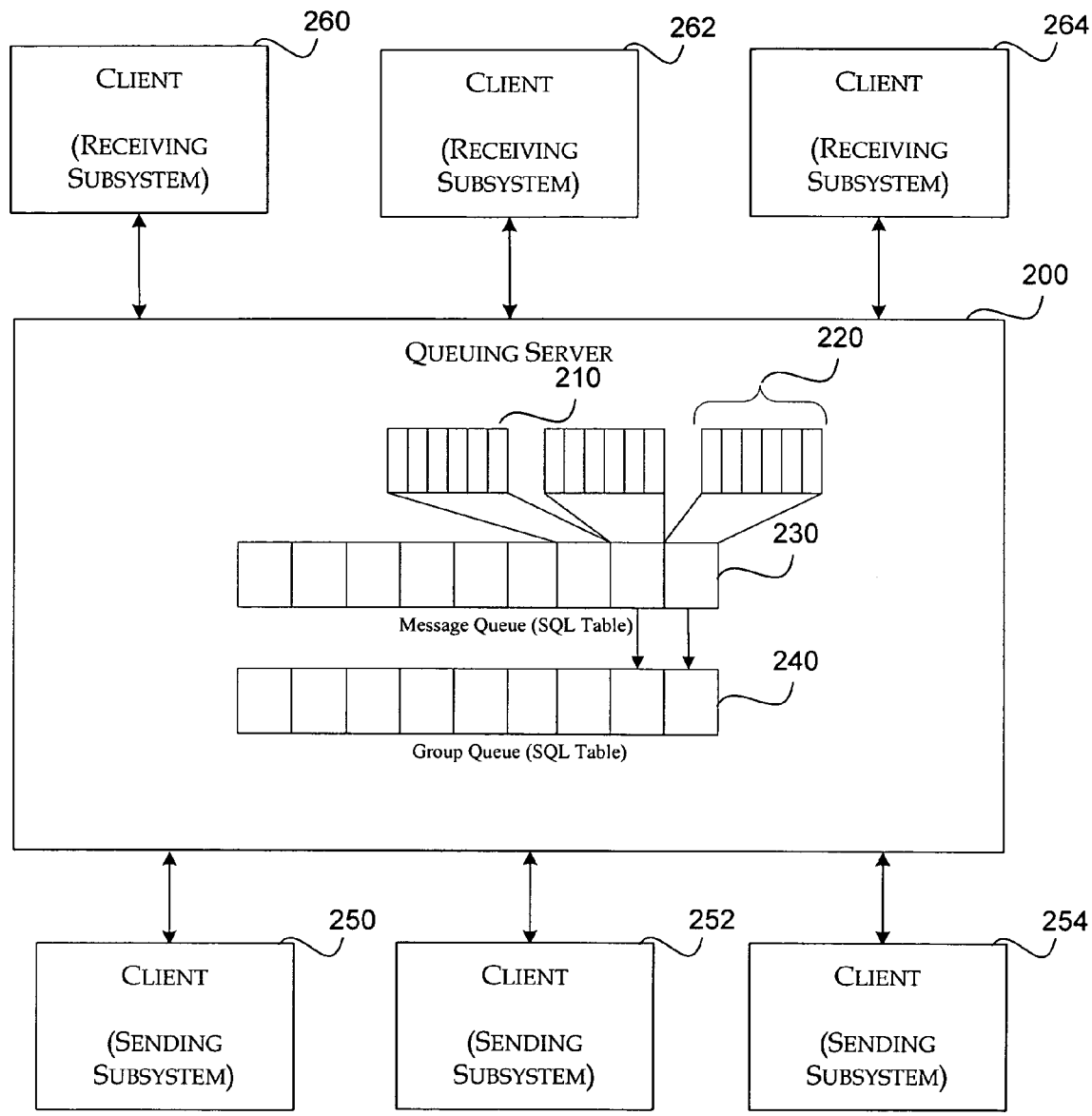
FIG. 2 illustrates a block diagram of a queuing system for reliable message transport in accordance with aspects of the current invention.

FIG. 2 illustrates a block diagram of a queuing system for reliable message transport in accordance with aspects of the current invention. The example system includes queuing server 200, sending subsystem clients 250, 252, 254, and receiving subsystem clients 260, 262, 264. (Other systems in accordance with the present invention may contain one or more sending subsystem clients and/or one or more receiving subsystem clients.) Server 210 includes one or more stored messages, which are organized as message groups 210. Message groups 210 are stored in message queue 230 (such as an SQL table) with each message group being associated with an entry in group queue 240 (which can also be an SQL table, for example).

Sending Messages:

Sending subsystem clients 250, 252, 254 can invoke Sender objects, which are defined below using an API (application program interface). For example, the sender object can be defined as follows:

```
public Sender(Type queueAccessType);
public Sender(Type queueAccessType, string serverId);
public Guid BeginMessageGroup(int messageType, int priority, Guid correlationId);
public void Send(object messageBody);
public void EndMessageGroup( );
public void CancelMessageGroup( );
```

First, a sending subsystem client creates a Sender object. The parameter for the constructor is typically a System.Type of a class providing an IQueueAccess interface (described below). An alternate constructor can take serverId, which can be an arbitrary string that identifies the server instance sending the message. This could be the machine name if only one instance of a Project Server is running on a given machine. The ServerID value is not typically used by the sending subsystem client.

Once a sender object is constructed, a client calls BeginMessageGroup( ). The messageType parameter is a client-defined value that can be used to distinguish between different types of messages that share a common queue. For example, message types can be messages of type Save, Publish, and Report. The client can define some arbitrary constants for these types of messages and that value can be used to branch to the proper message handling code on the receiving side.

The priority parameter can be used to specify a priority value for a message group. For example, a value of "one" can be the highest priority, while greater numbers can be lower priority.

The correlationId parameter is typically a client-supplied GUID that is used to correlate separate groups of messages. For example, messages (such as messages from a timesheet entry program) from a particular user are processed according to a predetermined order (such as the order in which they are received). Each timesheet submission can be sent as one message group. The correlation Id can be used by queuing server 200 to ensure that each of these groups is processed according to the predetermined order (such as a sequential order) even if there are multiple threads processing timesheet messages. In the timesheet example, the correlationId value can be the ResourceID.

The returned value for BeginMessageGroup( ) is a UID for the group. The UID can be used for queries concerning the status of the message group.

After a call to BeginMessageGroup, the sending subsystem client can send any number of messages using Send( ). The messageBody parameter is typically an arbitrary object that represents the message being sent. The messageBody parameter may contain both message data and even methods for processing that data on the receiving side. However, the arbitrary object should be capable of being organized according to a predetermined order (such as being capable of being serialized). Queuing server 200 typically takes care of serializing and deserializing the object for storage in the queue database table. The queue database table can be optimized such that if the message is already in binary format (e.g., a byte array), the system can writes the data "as is" to the database.

Once all messages have been sent, the client can call EndMessageGroup( ). EndMessageGroup( ) closes the group and marks it as ready for processing by the receiving code (described below).

If it is desired for some reason to discard an unfinished group, CancelMessageGroup( ) can be called. CancelMessageGroup( ) can be used to remove all messages sent subsequent to the call to BeginMessageGroup( ) from the queue. While no additional messages can be added to the group of messages after a call to EndMessageGroup, the Sender object itself can be reused by simply calling BeginMessageGroup again. A message group, as defined by all messages sent between a Begin/EndMessageGroup pair, is not typically processed until EndMessageGroup is successfully invoked. In the event of a system crash while sending messages, an incomplete group will be left in the queue. The incomplete group can be successfully removed by a cleanup process described below.

Receiving Messages:

The receiver system is designed to work as a thread that retrieves messages out of the queue and then calls the appropriate handling code. As a result, a developer of code to handle messages does not typically need to use any of the receiver object defined by the following API. The API is used to set up a receiving service when the project server is started or is activated manually by an administrator. The receiver object can be defined as follows:

```
public Receiver(Type queueAccessType, Type processMessageType, string serverId);
public void Start(bool asynchronous);
public void Stop( );
public bool Done;
public int ServiceLimit;
public int ThreadSleepTime;
```

The Receiver object is constructed using the parameters of queueAccessType, processMessageType, and serverID. The queueAccessType parameter is a System.Type of an object supporting the IQueueAccess interface, the processMessageType parameter is a System.Type of an object supporting the IProcessMessage interface, and the serverID is typically an arbitrary string that is used to identify the server instance to which the receiver belongs. If only one instance per machine is used, this can be the machine name. (The operation of these constructor parameters is described more fully below).

Once the Receiver object is constructed, it can be started by calling Start( ). Typically the receiver should probably run as a thread, and therefore the "asynchronous" parameter should be "true," although it can be run synchronously by passing in "false." Alternate embodiments can be implemented such that the system can always be run asynchronously.

Whether started synchronously or asynchronously, the receiving service can be shutdown by calling Stop( ). Calling Stop instructs the receiving service to shutdown any active worker threads and then exit. The Done property can be set to "true" when the receiver thread and all of the worker threads that are associated with the receiver thread are actually complete.

ServiceLimit is a read/write property that can be used to specify how many worker threads the receiver can use. ServiceLimit can be set to default to a value of "one." ServiceLimit can typically be changed while the receiver thread is running.

ThreadSleepTime is a read/write property that specifies how much time (e.g., in milliseconds) the receiver thread sleeps between each polling of the queue for new messages. ThreadSleepTime can be set to default to a value of 1000, which is one second when using units of milliseconds.

The sender and receiver typically take System.Type values for queueAccess and processMessageType (instead of an instance of the object itself) because of threading considerations. If the Sender and Receiver were to take in instances of the objects they require, these objects would have to be fully thread safe, which would imply that any other objects these objects referenced would also have to be thread safe. To avoid this problem, the Sender and Receiver instantiate (using the System.Type object passed) a copy of the specified objects for each thread spawned. Accordingly, only objects providing IQueueAccess or IProcessMessage should have to be apartment-thread safe (which means that they must protect access to static class members, but not any instance members).

Processing Messages:

When a receiving service is started, one of the parameters it takes is the System.Type of an object supporting the IProcessMessage interface, which is defined as follows:

```
public interface IProcessMessage
{
    bool ProcessMessageCallback(Message msg, Group messageGroup, MessageContext mContext);
    void StartMessageGroup(Group messageGroup, MessageContext mContext);
    void EndMessageGroup(Group messageGroup);
}
```

Each of the receiver object's worker threads instantiates an instance of the client's object. Before any messages are read, IProcessMessage.StartMessageGroup( ) is called. This gives the client a chance to do any initialization or other processing needed before processing a group of message. Next, for each message within a message group, IProcessMessage.ProcessMessageCallback( ) is called.

The return value of ProcessMessageCallback specifies whether or not the message was successfully processed. If a value "true" is returned, the message can be popped off the queue. A return value of "false" indicates that the message failed, and the queuing system can then call ProcessMessageCallback again with the same message.

When a receive thread is finished reading messages (either by receiving the last message or aborting due to an exception), IProcessMessage.EndMessageGroup( ) can be called. This gives the client a chance to do any cleanup or finalization that may be desired.

The Message parameter is typically the message itself. This object has the following properties:

```
public int MessageId;
public object MessageBody;
```

MessageId gives the ID of the message, which ID is unique within the group. The first message in a group typically has the ID of one, the second message in a group also has the ID of one, and the like. MessageBody is the object which was originally sent via the Sender.Send( ) method.

The Group parameter is an object that typically contains metadata about the group to which the message belongs. The Group parameter provides the following properties:

```
public Guid GroupId;
public Guid CorrelationId;
public int MessageType;
public int Priority;
public int LastMessageId;
```

GroupId is the unique identifier for the group. Each group of messages has a unique GroupId. CorrelationId is the unique identifier for a correlated group of messages. It corresponds to the parameter which is passed into Sender.BeginMessageGroup( ) when Sender.BeginMessageGroup( ) is invoked. MessageType is a client-defined enumerated type specifying the type of message. The MessageType corresponds to the parameter which is passed into Sender.BeginMessageGroup( ). Priority is the group priority. The Priority corresponds to the parameter which is passed into Sender.BeginMessageGroup( ). LastMessageId gives the MessageId of the last message in the group. Accordingly, msg.MessageId would be the same as messageGroup.LastMessageId when the last message in the group is encountered.

The MessageContext parameter may contain additional information about the current processing state of the message. The MessageContext parameter can be defined as follows:

```
public int RetryCount;
public int GroupRetryCount;
public int SleepBeforeRetry;
```

RetryCount is the number of times ProcessMessageCallback has been called with a particular message. On the first call, the value typically will be "one." GroupRetryCount is the number of times a particular group has attempted processing. If for some reason a receiver worker thread aborts processing a group, GroupRetryCount will retry the group, typically starting with the first unprocessed message. SleepBeforeRetry is a client set parameter which tells the worker thread how long it should sleep before retrying a message, should the processing of the message fail.

Low Level Queue Access:

Queuing server 200 is typically queue storage "agnostic" (i.e., the server is not dependent upon the inner workings of the queue storage). Queuing server 200 does queue read/write/pop accesses through an object that supports IQueueAccess, whose System.Type is passed in to the constructor of the Sender and Receiver objects. IqueueAccess can be defined as follows:

```
public interface IQueueAccess
{
    // Gets the next group that MSPSQS should process
    void GetNextGroup(out Group msgGroup);
    // removes the specified group from the queue
    void PopGroup(Group msgGroup);
    // returns the next message in the queue whose groupId ==
msgGroup.GroupId
    void ReadMessage(Group msgGroup, out Message msg);
    // pops the message specified by msgGroup and msg off the queue
    void PopMessage(Group msgGroup, Message msg);
    // opens a group of messages given the group metadata
    void OpenGroup(Group msgGroup);
    // enqueues a message, specified by msgGroup and msg
    void SendMessage(Group msgGroup, Message msg);
    // closes a group of messages
    void CloseGroup (Group msgGroup);
    // deletes all records of the given group from the message queue
and group queue
    void FlushGroup(Group msgGroup);
    // unlocks groups that are locked for sending by the server
instance named serverId
    void UnlockServerGroups(string serverId);
}
```

The default implementation of IQueueAccess can be built using two SQL tables (e.g., message queue 230 and group queue 240). However, due to this separation of queue access from the rest of queuing server 200, the whole system could be built on top of any suitable storage system (such as MSMQ or Yukon SSB).

Queue Storage:

Message queue 230 is a table that holds the actual message body data of a message sent from a sending subsystem client. For every Sender.Send( ) invocation, one row is typically added to this table. Although the figure shows groups of messages as being clustered together, in practice, messages from multiple groups might be interlaced. Message queue 230 typically serves a data container. The operations that are usually performed on this table are Insert a new message, Delete a processed message, and Select (read) the next message. A record in this table corresponds to the Message object described above.

The illustrated embodiment shows one table for Message queue 230, but alternative embodiments may split this table into multiple tables if desired. The alternative embodiments would only need to enhance the implementations of IQueueAccess.ReadMessage, IQueueAccess.PopMessage, and IQueueAccess.SendMessage to implement multiple tables. A second table, the group queue (240) is used to select the next group, to process and manage group and correlation locks, and to hold additional metadata. A record in this table corresponds to a Group object described above. There is usually a many-to-one relationship between records in Message queue 230 and group queue (240). Message queue 230 will typically have a record for each individual message sent. Group queue (240) will typically have one record for each group of messages sent.

Adding a New Group to the Queue:

When a sending subsystem client invokes Sender.BeginMessageGroup( ), a new record is added to the group queue. This record is marked as "locked for sending" to ensure that no receiver will begin processing a group until the group is complete. After the client has invoked Sender.Send( ) an arbitrary number of times, Sender.EndMessageGroup( ) can be invoked, which updates the group record with the ID of the last message sent, and marks the group as unlocked.

Figure 3:
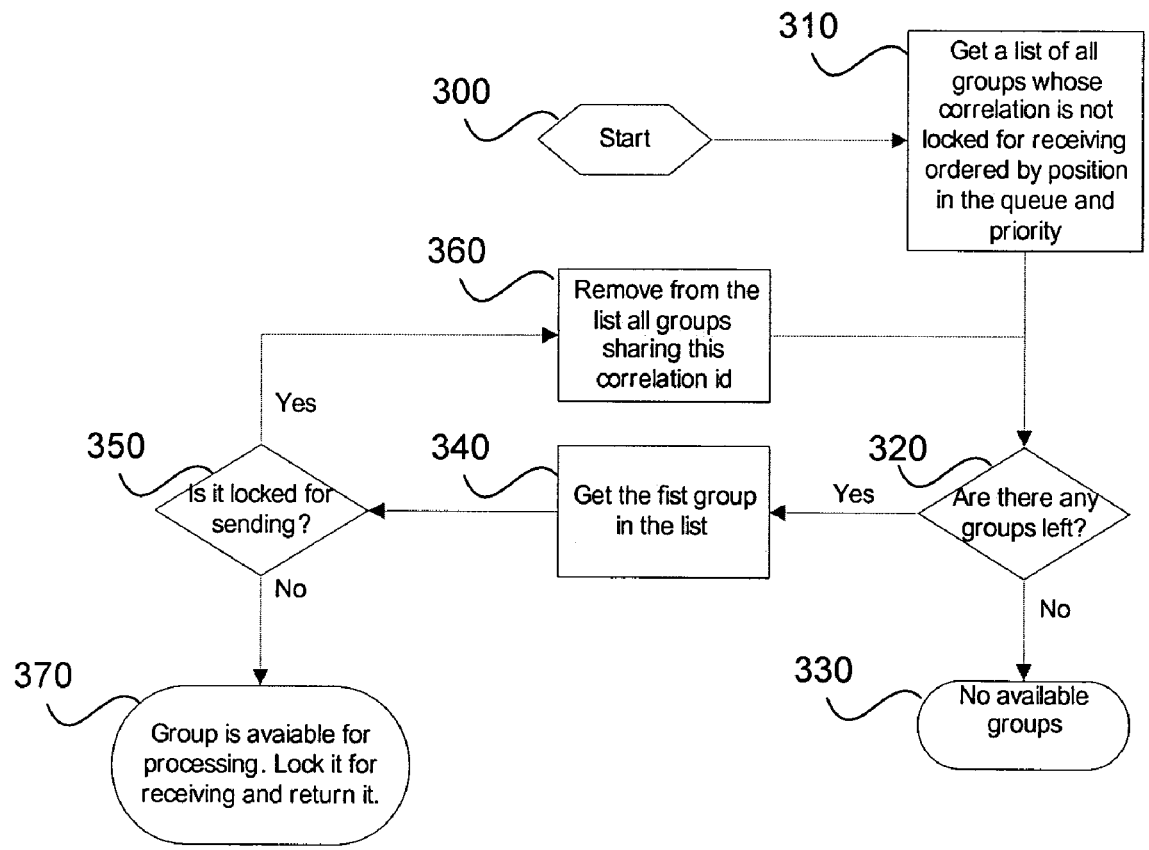
FIG. 3 illustrates an operational flow diagram illustrating a process for obtaining the next available group in accordance with aspects of the present invention.

Obtaining the Next Available Group:

FIG. 3 illustrates an operational flow diagram illustrating a process for obtaining the next available group in accordance with aspects of the present invention. Generally, the process looks for the highest priority group whose correlation group (those groups sharing a correlation ID) is not locked for receiving and whose group is not locked for sending and whose correlation has no groups ahead of the queue locked for sending that have a higher priority. The logic of the process can be varied in accordance with the usage of the queuing system.

The process begins at start block 300 and proceeds to block 310, where a list is obtained of all groups whose correlation is not locked for receiving. The list can be ordered by position in the queue and priority of particular message groups.

In block 320, a determination is made whether the list is non-empty and proceeds to block 340 if groups are present in the list. If no groups are present in the list, the process proceeds to block 330 and terminates.

In block 340, the first group in the list is obtained and is evaluated in block 350 to determine if the block is locked for sending. If the block is locked for sending, the process proceeds to block 360 where all groups that share the correlation ID of the locked group are removed from the list. If the block is not locked for sending, the process proceeds to block 370 where the block is locked for receiving and returned to the calling process.

Figure 4:
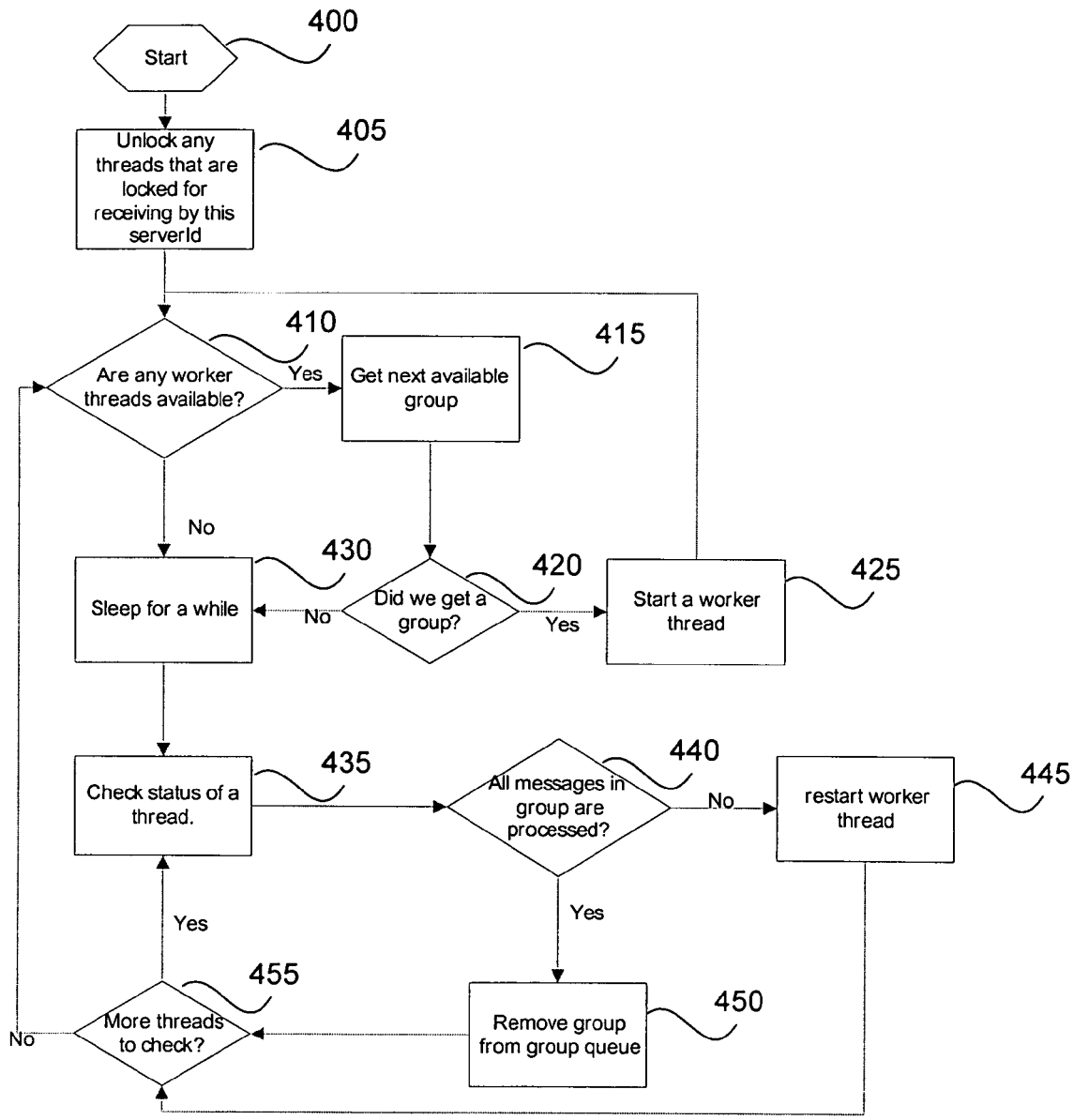
FIG. 4 illustrates an operational flow diagram illustrating a process for using receiver and worker threads in accordance with aspects of the present invention.

Obtaining the Next Available Group:

FIG. 4 illustrates an operational flow diagram illustrating a process for using receiver and worker threads in accordance with aspects of the present invention. Generally, a receiver thread watches the queue for available groups. Before a receiver thread begins polling the queue, it first unlocks any groups that are locked for sending by the server instance name passed in to the constructor's serverId parameter. The groups are unlocked to allow a cleanup/recovery process. If the receiver thread stopped abnormally (e.g., due to a machine reboot), groups currently processing would otherwise remain locked for sending. Accordingly, these groups are unlocked as soon as the server instance restarts.

After this, the receiver thread polls the queue for available groups. When one is available and the number of worker threads is less than the maximum allowed, it can create a worker thread to process the group. If the worker thread successfully processes the group, the group item is removed from the group queue. If not, the worker thread is restarted with the group.

The process begins at start block 400 and proceeds to block 405, where any locked threads are unlocked of receiving by the server instance to which the receiver belongs and to which the serverId is associated.

In block 410, a determination is made as to whether any worker threads are available. If any worker threads are available, the process proceeds to block 415 where the next available group is obtained. If no worker threads are available, the process proceeds to block 430 to wait before checking statuses of worker threads.

In block 420, a determination is made as to whether the next available group was obtained. If the next available group was obtained, the process proceeds to block 425 where a worker thread is started. After the worker thread is started the process returns to block 410. If the next available group was not obtained, the process proceeds to block 430 to wait before checking statuses of worker threads.

After waiting in block 430, the process proceeds to block 435, where the status of a worker thread is checked. In block 440, a determination is made as to whether all messages in the next available group have been processed. If all messages in the next available group have not been processed, the process proceeds to block 445 where the where the worker thread is restarted. If all messages in the next available group have been processed, the process proceeds to block 450 where the group is removed from the group queue.

After restarting the worker thread in block 445 or removing the group from the group queue in block 450, the process proceeds to block 455 where a determination is made whether there are any more worker threads to check. If there are any more worker threads to check, the process returns to block 435 where the status of a worker thread is checked. If there are no more worker threads to check, the process returns to block 410 where a determination is once again made as to whether any worker threads are available.

Figure 5:
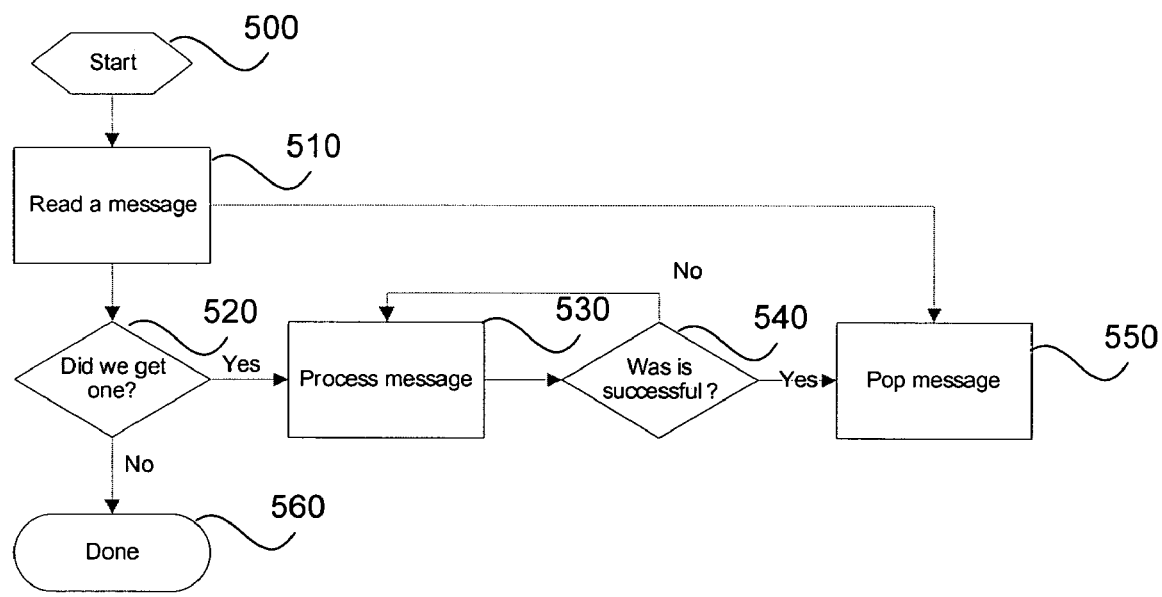
FIG. 5 illustrates an operational flow diagram illustrating a process for using message processing worker threads in accordance with aspects of the present invention.

Message Processing Worker Thread:

FIG. 5 illustrates an operational flow diagram illustrating a process for using message processing worker threads in accordance with aspects of the present invention. Generally, a message processing worker thread operates in a loop. While messages are on the message queue, the message processing worker thread reads a message and calls IProcessMessage.ProcessMessageCallback( ). If this function returns "true" (indicating successful processing of the message), the message is removed from the queue. Otherwise, it is retried.

The process begins at start block 500 and proceeds to block 505, where a message is read. In block 520, a determination is made as to whether a message was obtained successfully. If a message was obtained successfully the process proceeds to block 530. If a message was not obtained successfully the process proceeds to block 560 and terminates.

In block 530 the successfully obtained message is processed and the process proceeds to block 540 where a determination is made as to whether the message was processed successfully. If the message was not processed successfully, the process returns to block 530 where obtained message is processed again. (A check can be placed in the process logic to abort the processing if the message cannot be properly processed.) If the message was processed successfully, the process proceeds to block 550 where the message is "popped" (i.e., removed and the associated pointers adjusted) off the queue. After the message has been popped, the process returns to block 510 where another message is read. The process repeats until no more messages are obtained, in which case processing then terminates at end block 560.

Recovery from Subsystem Malfunctions:

Two cases of subsystem malfunctions are addressed: a situation in which a receiving machine is rebooted and comes back on line, and a situation in which a receiving machine crashes and does not come back on line for a substantial period of time. (A substantial period of time can be the length of time that another machine could be assigned the processing load that was carried by the machine that crashed.)

Recovery from a sending subsystem crash is enabled by marking the group entry in group queue 240 with the instance name of a receiver (serverId parameter to the constructor) when it is locked for receiving. In the reboot scenario, the first action upon restart of a receiving service is typically to unlock any groups locked for receiving by this instance. The groups can then be picked up and processed by any available receiving service.

When a receiving subsystem crashes and does not return for a substantial time, then (as is the case of a sender crash) there will usually be one or more groups marked for receiving that are stale. The cleanup for this case is accomplished by unlocking the group. As soon as it the group is unlocked, the group can be picked up for continued processing by a message processing thread.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for queuing messages, comprising:
   receiving a message group in a queuing system that is sent from a sender subsystem, wherein the message group comprises a group of messages; wherein each message within the group of messages is identified as belonging to the message group;
   storing each message of the group of messages within an entry of a message queue;
   in response to receiving the message group adding a new record to the group queue; wherein the record in the group queue identifies each of the messages in the message queue that comprise the received message group; wherein each record in the group queue is associated with a different message group;
   storing the received message group in a predetermined order within the group queue using the queuing system;
   receiving in the queuing system a correlation identifier for the message group, wherein the correlation identifier is used to associate the messages in the message group;
   storing the received correlation identifier using the queuing system; and
   sending the stored message groups in accordance with the predetermined order and the correlation identifiers.

2. The computer-implemented method of claim 1, wherein the received message group is stored in an SQL table.

3. The computer-implemented method of claim 1, wherein the stored message groups is sent to multiple machines.

4. The computer-implemented method of claim 1, wherein a priority value is associated with the received message group.

5. The computer-implemented method of claim 4, wherein the message group is sent in accordance with the associated priority values.

6. The computer-implemented method of claim 1, wherein a GUID is used as the correlation identifier.

7. The computer-implemented method of claim 6, wherein the GUID is client-supplied.

8. The computer-implemented method of claim 1, wherein the predetermined order is the order in which the message groups are received.

9. The computer-implemented method of claim 1, wherein a final message of a group is received before sending any stored message groups of the group.

10. The computer-implemented method of claim 1, further comprising locking-for-sending received message groups that are associated by the correlation identifier and unlockingfor-sending the received message groups once a final message that is associated by the correlation identifier is received.

11. A system for queuing messages, comprising:
means for sending a message group in a queuing system that are sent from a sender subsystem, wherein the message group comprises a group of messages; wherein each message within the group of messages is identified as belonging to the message group;
means for storing each of the messages within the message group within a separate entry in a message queue;
means for storing the received message group in a predetermined order within a group queue using the queuing system; wherein the group queue comprises a record for each received message groups;
means for receiving in the queuing system a correlation identifier for the message group, wherein the correlation identifier is used to associate the messages comprising the message group;
means for storing the received correlation identifier using the queuing system; and
means for sending the stored message groups in accordance with the predetermined order and the correlation identifiers.

12. The system of claim 11, wherein the received message groups are stored in an SQL table.

13. The system of claim 11, wherein the stored message groups are sent to multiple machines.

14. The system of claim 11, wherein a priority value is associated with each received message group.

15. The system of claim 14, wherein the message groups are sent in accordance with the associated priority values.

16. A computer-readable storage medium having computer-executable instructions for managing a queuing system for messages, comprising:
instructions for receiving message groups in a queuing system that are sent from a sender subsystem, wherein each message group comprises messages;
instructions for storing each of the messages within an entry of a message queue such that different messages from different message groups are contained within the message queue;
instructions for adding a new record to a group queue in response to receiving each of the message groups; wherein each record in the group queue identifies one of the received message groups;
instructions for storing the received message groups in a predetermined order within the group queue using the queuing system;
instructions for receiving in the queuing system a correlation identifier for each message within a message group, wherein the correlation identifier is used to associate message groups;
instructions for storing the received correlation identifier using the queuing system; and
instructions for sending the stored message groups in accordance with the predetermined order and the correlation identifiers.

17. The computer-readable storage medium of claim 16, wherein a GUID is used as the correlation identifier.

18. The computer-readable storage medium of claim 16, wherein the predetermined order is the order in which the message groups are received.

19. The computer-readable storage medium of claim 16, wherein a final message group of an associated group is received before sending any stored message groups of the associated group.

20. The computer-readable storage medium of claim 16, further comprising locking-for-sending received message groups that are associated by the correlation identifier and unlocking-for-sending the received message groups once a final message group that is associated by the correlation identifier is received.

* * * * *